Jan. 17, 1961  HIROSHI YANAI ET AL  2,968,763
COMBINED INSULATION AND CONTINUITY TESTERS
Filed March 18, 1958  2 Sheets-Sheet 1

United States Patent Office 2,968,763
Patented Jan. 17, 1961

2,968,763
COMBINED INSULATION AND CONTINUITY TESTERS

Hiroshi Yanai and Totaro Enomoto, Hitachi City, Japan, assignors to Hitachi Limited, Tokyo, Japan Filed Mar. 18, 1958, Ser. No. 722,340

3 Claims. (Cl. 324—62)

This invention relates to a combined insulation and continuity tester, i.e. an insulation tester provided with a scale for measuring conductor resistance, which is characterized in that the part of scale between the lowest scale outside of the effective scale based on the Japanese Industrial Standards (JIS) and the zero point is made as specially enlarged continuity scale.

The object of this invention is to provide an improved insulation tester which can be used for the measurement of both insulation resistance and conductor resistance and also which enables continuous measurement of an insulation resistance from zero to a required value.

For a better understanding of this invention, reference is taken to the accompanying drawings which show some embodiments of this invention, of which Fig. 1 is a connection diagram when the tester is used for measuring an insulation resistance;

Figure 1:
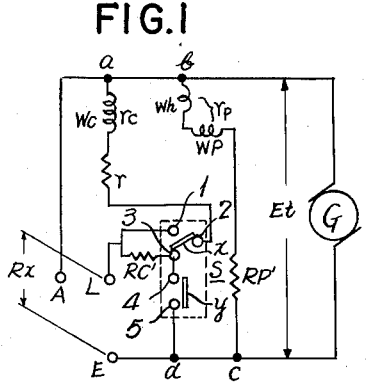

Referring to the drawing, Wc represents a current coil, i.e. a driving coil having a resistance $rc$, and Wp represents a pressure coil, i.e. a controlling coil. These coils Wc and Wp intersect at a suitable angle and so connected that their torques are opposite and the distribution of flux density through air gap is located in the magnetic field which is substantially symmetrical to the magnetic axis. Wh represents an auxiliary coil wound on the driving coil Wc and connected in series to the circuit of controlling coil Wp, developing a torque to assist the torque of the driving coil Wc. $rp$ represents the resistance of these two coils Wh and Wp, and Rp' a series resistance and the total resistance between the terminals $b$ and $c$ is taken as Rp. G represents a direct current generator used as a power source and having the terminal voltage E$t$. $r$ is the series resistance of the current coil Wc, and Rc' is the resistance of a change-over circuit. L represents a line terminal for measurement, E and A represent a ground terminal and auxiliary terminal respectively. S represents a change-over switch comprising terminals 1 to 5 and two sets of contact members $x$ and $y$, of which the contact member $x$ is used for connecting the terminal 2 selectively to terminal 1 or 3. The other contact member $y$ is used to connect and disconnect the terminals 4 and 5.

Figure 3:
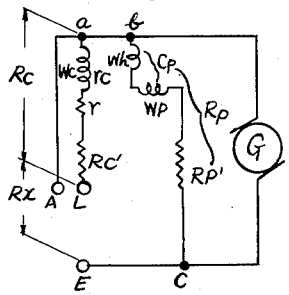
Fig. 3 is a simplified equivalent circuit diagram corresponding to Fig. 1.
Figure 4:
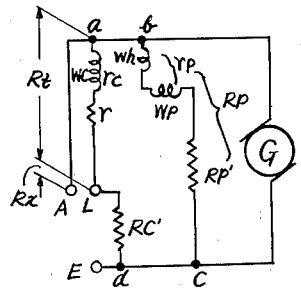
Fig. 4 is a similar diagram to Fig. 3 corresponding to to Fig. 2.
Figure 5:
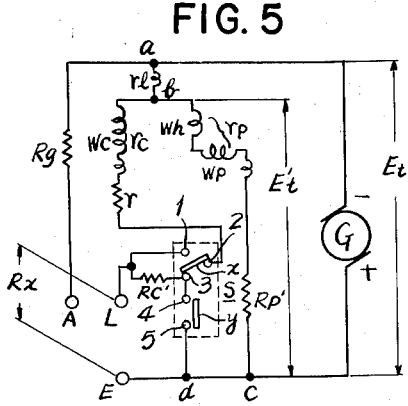
Fig. 5 is a connection diagram of a modified embodiment of this invention when the tester is used as an insulation tester.
Figure 6:
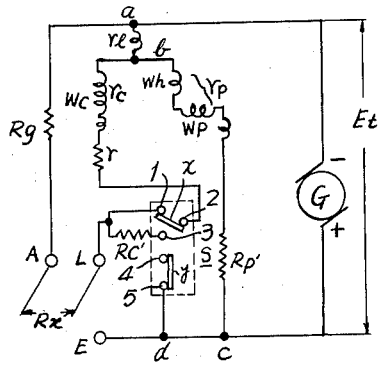
Fig. 6 is a similar diagram to Fig. 5 when the tester is used as a continuity tester.
Figure 7:
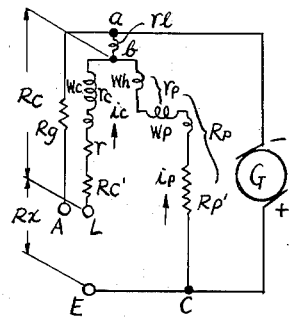
Figs. 7 and 8 are simplified equivalent circuit diagrams corresponding to Figs. 5 and 6 respectively.

These contact members $x$ and $y$ are constructed to be operated by a handle simultaneously. Terminal 1 is connected to the terminals L and the resistance Rc' is connected between the terminal 3 and L. The terminal 2 is connected to the resistance $r$, while the terminals 4 and 5 are connected between the terminal 3 and point $d$. Rx represents the resistance value of the object to be measured which in the case of an insulation tester is connected between the terminals L and E, whereas in the case of continuity tester it is connected across the terminals L and A. Figs. 3 and 4 show equivalent circuits corresponding to each of these cases respectively, wherein Rc is equal to $rc+r+Rc'$ and $Rt=rc+r$. The resistance Rc' has a very high resistance value if compared with those of $rc$, $r$ etc., i.e. $Rc \gg Rt$.

Figure 2:
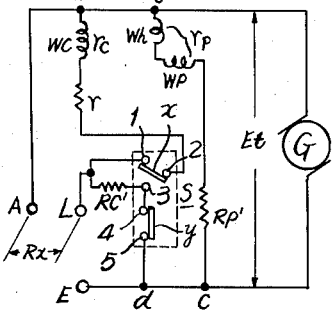
Fig. 2 is a connection diagram when the tester is used for measuring a conductor resistance.

When the resistance tester constructed as above described is used as an insulation tester, the switch S is positioned as shown in Fig. 1 and the insulator of which the insulation resistance is to be measured is connected across L and E. On the other hand, if the instrument is used for continuity tester the swtch S is as shown in Fig. 2 and the object to be measured is connected across the terminals A and L. Now if the conductor resistance is zero the current coil Wc is effectively short-circuited by the conductor so that the current passing through the coil becomes zero and this is equivalent to the case when the insulation resistance is infinite and accordingly the zero position as the continuity tester coincides with the infinity position of the insulation tester. If the resistance of the object to be measured is infinitely large, the insulation tester will be as if it has been short-circuited since the terminals L and E are connected with the resistance Rc' so that the infinity position as the continuity tester coincides with the zero position of the insulation tester. When the conductor resistance is a certain limited value the current shunted to the current coil Wc varies according to the resistance value so that an intermediate value between the zero and infinity position is indicated, thereby enabling the measurement of conductor resistance can be selected as desired and its reason is explained below.

For the sake of convenience of explanation the following symbols are used:

Nc—number of turns of current coil Wc
Kc—constant depending on the shape
Np—number of turns of pressure coil
Kp—constant depending on the shape
Nh—number of turns of auxiliary coil Wh
Kh—constant depending on the shape
Bpm—flux density at a position occupied by the current coil Wc when the pointer needle has stopped on the central scale
Rm—measured resistance equal to the central scale of the continuity tester
$n$—Np/Nh In the case of insulation tester as shown in Figs. 1 and 3 the following relation exists $$Nc = \frac{Rc}{Rp}(n^2-1)Nh \qquad (1)$$

In the case of continuity tester as shown in Figs. 2 and 4, since $Rc' \gg Rt$ the current flowing through the resistance Rc' is nearly equal to $Et/Rc'$ and this current flows through the circuits of Rx and Rt so that the current $ic$ passing through the circuit Rt will become as follows:

$$ic = \frac{Et}{Rc'} \times \frac{Rx}{Rx+Rt}$$

$$= \frac{Et \cdot Rm}{Rc(Rm+Rt)} \ [\because Rc' = Rc, \ Rx = Rm]$$

When the pointer needle stops on the central scale the above current flows through the current coil and also in that case the algebraic sum of the torques developed by each of these coils is zero so that the following equation is established if the torque of ligament passing the current through the movable coil is neglected.

$$KcBcmNc\frac{Et \cdot Rm}{Rc(Rm+Rt)}$$
$$+KhBcmNh\frac{Et}{Rp}-KpBpmNp\frac{Et}{Rp}=0 \quad (2)$$

As it is easy to design the coils to satisfy the condition of $Kc=Kh=Kp$ and also $Bcm=Bpm$ from the symmetrical relation of flux distribution, the Equation 2 will become $$\frac{NcRm}{Rc(Rm+Rt)}+\frac{Nh}{Rp}-\frac{Np}{Rp}=0 \quad (3)$$

$$Np=nNh \quad (4)$$

As the following equation establishes by introducing the Equations 1 and 4 into 3

$$\frac{\frac{Rc}{Rp}(n^2-1)NhRm}{Rc(Rm+Rt)}+\frac{Nh}{Rp}-\frac{nNh}{Rp}=0 \quad (5)$$

By selecting $Rc=KRp$ (K is a constant) the above Equation 5 will become $$\frac{(n^2-1)Rm}{Rm+Rt}+1-n=0$$

Accordingly $$Rm=\frac{Rt}{n} \quad (6)$$

The central scale $Rm$ of the continuity tester can be selected as desired by properly selecting values of $n$ and $Rt$, i.e. the value of $r$ and it can be suitably designed according to the required object. This invention has special advantage that the resistance $Rc'$ for determining the central scale and the zero position of the insulation tester may be used also as the resistance for determining the infinity position of the continuity tester so that only one resistance $Rc'$ is sufficient.

Figure 9:
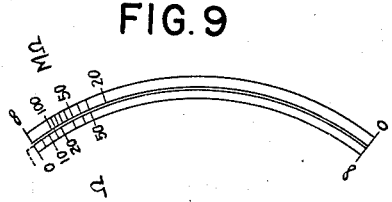
Fig. 9 shows a part of scales taken for explanation.
Figure 10:
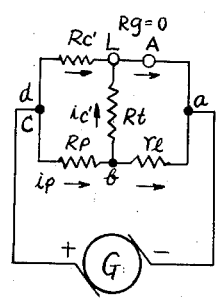
Figs. 10 and 11 are equivalent circuit diagrams taken for explanation.

In Fig. 9, MΩ represents the scale of insulation resistance and Ω that of conductor resistance.

Figure 8:
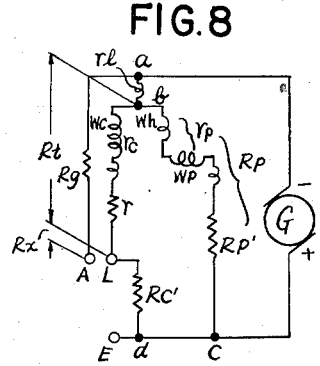

As apparent from the foregoing description the infinity position of the insulation tester should coincide with the zero position of the continuity tester, but in practice it does not coincide and the zero position of the continuity tester is shifted to the outside of the effective scale as shown by the broken line in Fig. 9. After numerous investigations about its cause the inventors have ascertained that the insulation tester, to which the principle of ratio meter is applied, including two coil type having no auxiliary winding W$h$ and three coil type having an auxiliary coil usually uses a ligament having the resistance of about few ohms for passing current through the coil and it is connected to the ligament $a$—$b$ with the negative sides of both of the current coil and pressure coil (auxiliary coil in case of three coil type) as a unit. Accordingly if the ligament resistance is $rl$ the equivalent circuit in this case will become as shown in Fig. 8. In this figure, $Rp$ represents the total resistance of the pressure coil circuit, $Rt$ the total resistance between $b$ and L when the switch S1 is closed, $ip$ the current flowing through the pressure coil circuit and $ic'$ represents the current flowing through the circuit of the resistance $Rt$. In Fig. 8 which shows the case when the terminals A and L are short-circuited the bridge circuit is unbalanced and the current $ic'$ flows through the circuit of resistance $Rt$ and this current results in the reversing the torque of the current coil W$c$ in the normal case so that the zero position is shifted.

The present invention is based on the above investigations and the defect is avoided by inserting a compensating resistance $Rg$ between terminals $a$ and A and its value is selected according to the following relation:

$$Rg=\frac{Rc'}{Rp}rl$$

Figure 11:
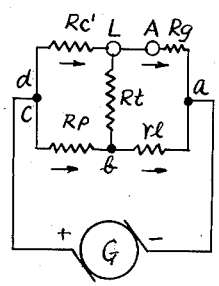

This equation satisfies the condition of balancing the bridge circuit as shown in Fig. 11. As the result current does not flow through the circuit of the resistance $Rt$, i.e. the circuit of the current coil so that the zero position of the continuity tester can be made to safely coincide with the infinity position of the scale of insulation tester and thus providing a great convenience in the manufacture of these scales.

What we claim is:

1. A tester comprising a voltage source having first and second poles; ground, line and auxiliary terminals; said ground and auxiliary terminals being connected respectively to said first and second poles; a pressure coil connected between said poles; a drive coil connected to said second pole; a switch connected to said drive coil, and a resistance connected to said switch and line terminal, continuity being tested between said line and auxiliary terminals and insulation being tested between said line and ground terminals, said switch for insulation testing connecting said drive coil via said resistance to said line terminal and for continuity testing connecting said drive coil directly to said line terminal and via said resistance to said ground terminal, said coils being angularly disposed with an air gap therebetween and creating a magnetic field in said gap, the field having an axis about which its flux density distribution is substantially symmetrical.

2. A tester as claimed in claim 1, wherein said pressure and drive coils are operatively associated in magnetically bucking relation.

3. A tester as claimed in claim 1, wherein said pressure and drive coils are operatively associated in magnetically bucking relationship, said tester further comprising an auxiliary coil on said drive coil but connected in electrical series with said pressure coil.

References Cited in the file of this patent
UNITED STATES PATENTS

| | | |
|---|---|---|
| 2,359,779 | Macadie et al. | Oct. 10, 1944 |
| 2,606,230 | Perry | Aug. 5, 1952 |